United States Patent
Missett et al.

(10) Patent No.: US 9,137,129 B2
(45) Date of Patent: Sep. 15, 2015

(54) PROPAGATING LINK STATUS ACROSS A NETWORK

(71) Applicant: Calix, Inc., Petaluma, MN (US)

(72) Inventors: Shaun Noel Missett, Avon, CT (US); Berkay Baykal, Westborough, MA (US); Tim Joseph Ethen, Maple Grove, MN (US)

(73) Assignee: Calix, Inc., Petaluma, CA (US)

( * ) Notice: Subject to any disclaimer, the term of this patent is extended or adjusted under 35 U.S.C. 154(b) by 136 days.

(21) Appl. No.: 13/764,255

(22) Filed: Feb. 11, 2013

(65) Prior Publication Data

US 2014/0226972 A1    Aug. 14, 2014

(51) Int. Cl.
  *H04L 12/26* (2006.01)
  *H04L 12/703* (2013.01)
  *H04L 12/24* (2006.01)
  *H04L 12/751* (2013.01)

(52) U.S. Cl.
  CPC ............ *H04L 43/0811* (2013.01); *H04L 43/10* (2013.01); *H04L 41/0213* (2013.01); *H04L 41/0677* (2013.01); *H04L 45/02* (2013.01)

(58) Field of Classification Search
  CPC ..... H04L 43/0811; H04L 43/10; H04L 45/28; H04L 41/06
  USPC .......................................... 370/236, 241, 216
  See application file for complete search history.

(56) References Cited

U.S. PATENT DOCUMENTS

| | | | |
|---|---|---|---|
| 2008/0089235 A1* | 4/2008 | Kotrla et al. | 370/242 |
| 2012/0093508 A1 | 4/2012 | Baykal et al. | |
| 2013/0114394 A1* | 5/2013 | Hu et al. | 370/216 |
| 2014/0078884 A1* | 3/2014 | Shukla et al. | 370/216 |

OTHER PUBLICATIONS

"Ethernet Operations, Administration, and Maintenance", Sep. 2007, pp. 115, Publisher: CISCO.
"Ethernet Service Oam: Overview, Applications, Deployment, and Issues", Jun. 2010, pp. 118, Publisher: Fujitsu.
"Carrier Ethernet Services Overview", Aug. 2008, pp. 132, Publisher: Metro Ethernet Forum.
"Technical Specification Mef 17: Service OAM Requirements and Framework—Phase 1", Apr. 2007, pp. 120, Publisher: Metro Ethernet Forum.

(Continued)

*Primary Examiner* — Charles C Jiang
*Assistant Examiner* — Will Lin
(74) *Attorney, Agent, or Firm* — Fogg & Powers LLC

(57) ABSTRACT

An access network comprises a first network interface device coupled to a customer network and configured to provide an interface between the access network and the customer network. The access network also comprises a second network interface device coupled to a core network and configured to provide an interface between the access network and the core network. The first network device is configured to insert a Status Type Length Value (TLV) element into a Continuity Check Message (CCM) to form a modified CCM and to transmit the modified CCM to the second network interface device. The Status TLV element includes fields for at least one of a dying gasp indication from a customer premise equipment or performance monitoring data. The second network interface device is configured to store data from the Status TLV in a database entry associated with an identification number of the first network interface device.

17 Claims, 6 Drawing Sheets

(56) References Cited

OTHER PUBLICATIONS

"Technical Specification Mef 30: Service OAM Fault Management Implementation Agreement", Jan. 2011, pp. 140, Publisher: Metro Ethernet Forum.

"Technical Specification Mef 4, Metro Ethernet Network Architecture Framework—Part 1: Generic Framework", May 2004, pp. 128, Publisher: Metro Ethernet Forum.

Santitoro, "Metro Ethernet Services—A Technical Overview", Apr. 2003, pp. 119, Publisher: Metro Ethernet Forum.

"Introducing the Specifications of the Metro Ethernet Forum", Feb. 12, 2013, pp. 1-15.

"Introducing the Specifications of the Metro Ethernet Forum MEF 17 Service OAM Framework and Requirements", Feb. 2008, pp. 1-14.

"MEF 30 Service OAM Fault Management Implementation Agreement", Feb. 12, 2013, pp. 1-33.

* cited by examiner

| | | |
|---|---|---|
| 157 | Remote Errored Symbols - Total since Reset | ~230 A |
| 161 | Remote Errored Symbol Events - Total since Reset | ~230 B |
| 165 | Timestamp of Last Remote Errored Symbol Event | ~230 C |
| 169 | Remote Errored Frames - Total since Reset | ~232 A |
| 173 | Remote Errored Frames - Total since Reset | ~232 A |
| 177 | Remote Errored Frame Events - Total since Reset | ~232 B |
| 181 | Timestamp of Last Remote Errored Frame Event | ~232 C |
| 185 | Remote Errored Frame Period Frames - Total since Reset | ~234 A |
| 189 | Remote Errored Frame Period Frames - Total since Reset | ~234 A |
| 193 | Remote Errored Frame Period Events - Total since Reset | ~234 B |
| 197 | Timestamp of Last Remote Errored Frame Period Event | ~234 C |
| 201 | Remote Errored Frame Seconds - Total since Reset | ~236 A |
| 205 | Remote Errored Frame Second Events - Total since Reset | ~236 B |
| 209 | Timestamp of Last Remote Errored Frame Second Event | ~236 C |
| 213 | End TLV (0)   ~238 | |

FIG. 2(2)

PROPAGATING LINK STATUS ACROSS A NETWORK

BACKGROUND

In order to provide telecommunications services, such as internet access, plain old telephone service, etc., a customer device is typically coupled to the core network of a service provider via an access network. The access network can implement various standards and protocols. Management of the end-to-end network can be divided into various domains, such an operator domain for the access network and a service provider domain which spans multiple access networks.

SUMMARY

In one embodiment, an access network is provided. The access network comprises a first network interface device coupled to a customer network and configured to provide an interface between the access network and the customer network. The access network also comprises a second network interface device coupled to a core network and configured to provide an interface between the access network and the core network. The first network device is configured to insert a Status Type Length Value (TLV) element into a Continuity Check Message (CCM) to form a modified CCM and to transmit the modified CCM to the second network interface device. The Status TLV element includes fields for at least one of a dying gasp indication from a customer premise equipment in the customer network or performance monitoring data for the link coupling the customer network to the first network interface device. The second network interface device is configured to store data from the Status TLV in a database entry associated with an identification number of the first network interface device.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
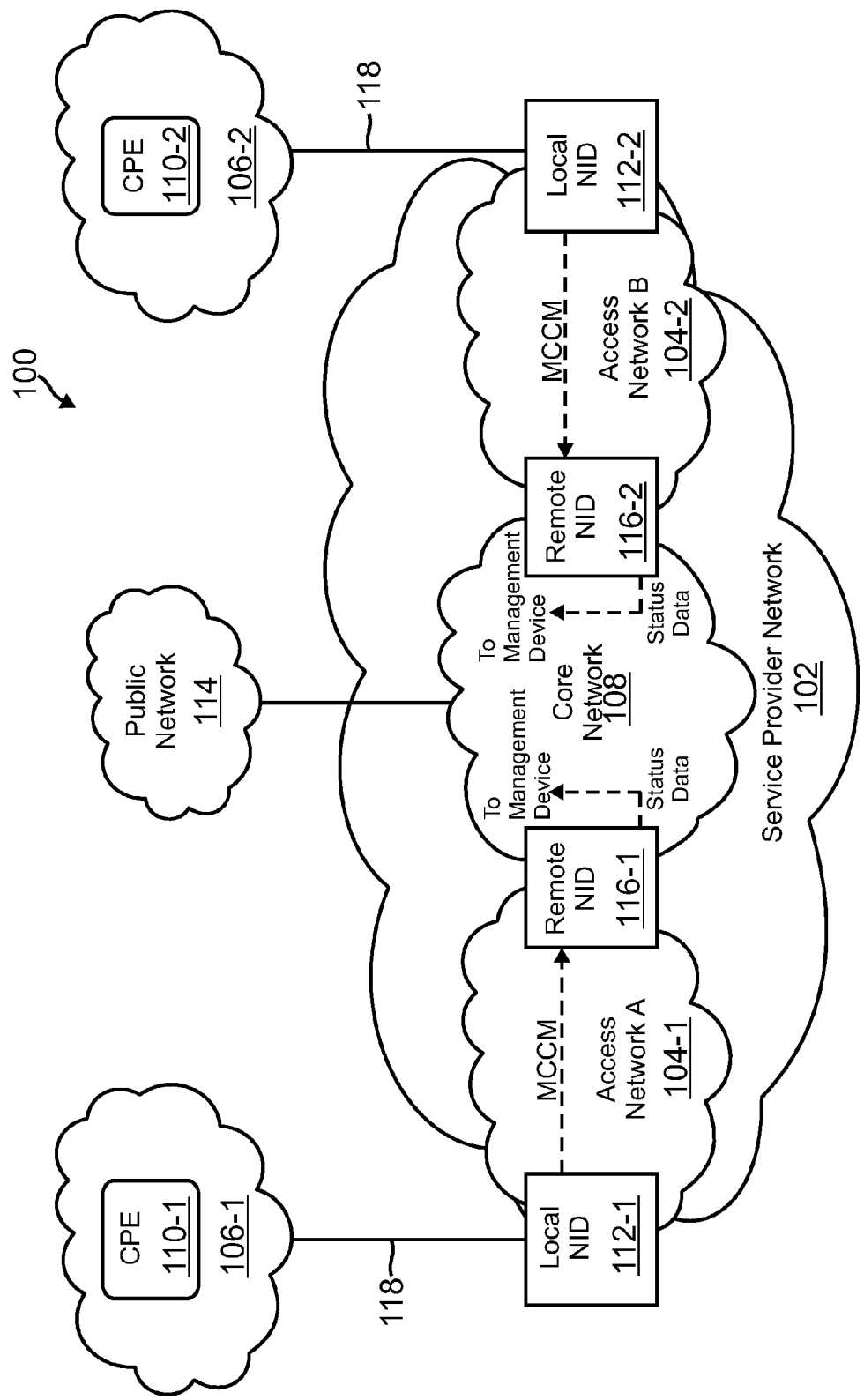
FIG. 1 is a block diagram of one embodiment of an exemplary system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of one embodiment of a system 100. System 100 includes a service provider network 102 which comprises a number of different types of computer networks interconnected to one another. For example, service provider network 102 includes access networks 104-1 and 104-2 (also referred to herein as "operator networks"). Access networks 104-1 and 104-2 connect customer networks 106-1 and 106-2, respectively, to the core network 108. In particular, the access networks connect one or more respective customer premise equipment (CPE) 110 in each of customer networks 106-1 and 106-2 to the core network 108. As is understood by one of skill in the art, a core network is a portion of a telecommunication network that provides various services to customers who are connected by an access network to the core network.

The core network 108 is coupled to public network 114. Public network 114 represents any type of network that is made available for general public access. Public network 114 commonly implements at least one layer three (L3) protocol (such as an Internet protocol or IP) to communicate data in the form of packets, where reference to layers followed by a number refers to an indicated layer of an Open Systems Interconnection (OSI) model. For this reason, public network 114 may be referred to as a packet-switched network. While shown as a single network, public network 114 may comprise one or more networks that are each interconnected to form public network 114. For example, public network 114 may comprise a large number of networks generally referred to collectively as the "Internet."

The core network 108 can comprise one such network that is interconnected with other networks to form public network 114. Hence, the core network 108 is shown separately from public network 114 for purposes of illustrating the techniques described in this disclosure. While described with respect to core network 108, the techniques may be implemented with respect to any type of network, including private networks that do not generally permit the general public to access the private network without first authenticating themselves as a valid member of that network.

In addition to or in lieu of the internet service by which CPE 110 may interface with public network 114, the core network 108 can also be configured to provide a television service (such as a cable television service), and/or a telephone service (either by way of a plain old telephone system (POTS), which is often referred to as a "landline" service or as a Voice over IP (VoIP) service). In some instances, a service provider that owns and operates service provider network 102 may provide the infrastructure by which to provide one or more of the above noted services. Competing service providers may also contract with the service provider that owns and operates core network 108 to provide competing and additional services to those provided by the service provider that owns and operates core network 108. In any event, service provider network 102 may provide a collection of one or more services, such as the services discussed above.

The CPE 110, which may also be referred to herein as a "subscriber device", may include Internet-ready televisions, non-Internet-ready televisions, set-top boxes (STBs), gaming consoles, personal media players, digital video disc (DVD) players, Blu-ray players, desktop computers, laptop computers, slate or tablet computers, wireless telephones (including so-called "smart phones"), global positioning system (GPS) devices, wireless access points (WAPs), switches, hubs, printers, servers, and any other similar devices commonly employed by customers to access one or more of the services provided by service provider network 102. Each of customer networks 106 represents a network owned and operated by customers of service provider network 102.

Typically, a customer's premises (e.g., a customer's home or business) provides the necessary infrastructure (such as the physical communication medium) to support each of customer networks 106. For example, each of customer networks 106 can include coaxial cable, copper telephone lines, Ethernet cable (which is typically referred to as "category 5 cable" or "cat5 cable"), wireless communication medium or any other type of physical communication medium commonly employed in customer premises to facilitate the communication of data, such as voice data, Internet data, or video data. In addition, the customer networks 106 can be as simple as a single subscriber device 110 coupled to the respective access network 104 or may involve multiple subscriber devices 110 networked together in a local area network (LAN), the LAN being coupled to the respective access network 104.

The access network 104 supports any one of multiple physical layer infrastructures. For example, the access network 104 can be configured to provide access through a passive optical network (PON) infrastructure, such as a gigabyte PON (GPON) infrastructure or an Ethernet PON (EPON) infrastructure; an Active Ethernet (AE) optical network; a digital subscriber line (DSL) infrastructure; or a data over cable service interface specification (DOCSIS) compliant infrastructure.

In this example, each access network 104 supports the layer two (L2) protocol referred to as Ethernet. In deploying this form of Ethernet-based access network, each access network 104 includes a Local Network Interface Device (NID) 112 and a Remote NID 116. Local NID 112 is configured to transition the connection from the respective customer network 106 to the respective access network 104. The term "local" as used in this context means an NID which provides an interface to a customer network. Hence, Local NID 112 is also referred to as a user-facing provider edge (U-PE) device. Remote NID 116 is configured to transition the connection from the respective access network 104 and the core network 108. The term "remote" as used in this context means an NID which provides an interface to the core network. Hence, Remote NID 116 is also referred to as a network-facing provider edge (N-PE) device.

It is to be understood that each access network 104 may include more than one Local NID 112 and/or more than one Remote NID 116. In addition, it is to be understood that each access network 104 may include other intermediate devices communicatively coupled between the Local NID 112 and the Remote NID 116. Thus, each access network 104 may include combinations of various network devices such as access nodes, network switches, and routers. However, for each of explanation only one Local NID 112 and one Remote NID 116 are depicted in each access network 104 of FIG. 1.

In addition, each access network 104 can be implemented at the physical layer using one or more of fiber optic links, copper lines, coaxial cables, or other physical medium used for the transport of communication signals. The Local NID 112 also provides a subscriber drop or link 118 to the respective customer network 104 using one of a fiber optic link, copper line, coaxial cable, or other physical medium. Furthermore, in some embodiments, wireless communication mediums that do not involve physical communication cabling can be used for the link 118 or for communication of signals through access network 104.

In addition to providing an interface to the core network 108, Remote NID 116 can also be configured as an aggregation device that aggregates traffic from nodes within the respective access network 104 for delivery upstream to public network 114 and that distributes traffic from public network 114 downstream to nodes within the respective access network 104. Generally, the term "upstream traffic" refers to traffic from customer networks 106 to public network 114 and the term "downstream traffic" refers to traffic from public network 114 to customer networks 106.

While shown as including two access networks 104 in the example of FIG. 1 for ease of illustration, service provider network 102 may include more than two access networks or a single access network that are substantially similar to access networks 104-1 and 104-2. Moreover, as stated above, while shown as including only a single Remote NID 116 in each access network 104 in the example of FIG. 1, also for ease of illustration, each access network 104 may include multiple network interface devices that each aggregate traffic for multiple access nodes. Similarly, more than two customer networks 106 can be implemented in other embodiments. The techniques should not therefore be considered limited in these respects to the examples shown in FIG. 1.

As shown in FIG. 1, the service provider network 102 provides a Metro Ethernet Forum (MEF) service between two or more endpoints which spans multiple Operator networks 104-1 and 104-2. Hence, in FIG. 1, the service provider Ethernet Operations Administration, and Maintenance (OAM) Maintenance Entity Group (MEG) spans the Access Networks 104-1 and 104-2 allowing the service provider 208 to monitor the Service Level Agreement (SLA) and connectivity of the endpoints which make up the service. The service provider is able to monitor the connectivity of each endpoint via continuity check and the SLA conformance via Y.1731 Loss Monitoring and Delay Monitoring which allows the service provider and its customers a look at the behavior of the service provider network 102, as understood by one of skill in the art.

However, a service provider of a conventional system typically does not have access to the alarm and Performance Monitoring (PM) systems of each access network, especially when the service provider OAM MEG spans multiple operator networks. Hence, in a conventional system, the service provider is essentially blind to the local link drop 118 to the customer network 106. For example, the service provider in a conventional system does not have access to events like a 'Dying Gasp.' In contrast, as described below, system 100 is configured to enable the service provider to see the local link performance monitoring and remote events like a 'Dying Gasp.' As used herein a 'Dying Gasp' is a message (or signal) sent by a CPE when a power outage occurs. The power outage can be due to a customer intentionally powering off the CPE or due to an unintentional power outage.

Knowledge of a 'Dying Gasp' indication from the subscriber equipment is important because it informs the service provider that the subscriber equipment has been powered off as opposed to a fiber or cable being cut, for example. Hence, the 'Dying Gasp' can reduce the need for a repair service truck roll since the issue is on the subscriber side versus the service provider. It is also advantageous to the service provider to know whether the drop side is experiencing excessive errors on the line so pre-emptive maintenance can take place before customer complaints are received.

In order to provide such information to the service provider, the system 100 is configured to place the local link OAM information from the subscriber drop 118 into the management domain of the service provider via the addition of a new Link OAM Status Type Length Value (TLV) element to the Continuity Check OAM mechanism that is defined by IEEE 802.1ag and ITU Y.1731.

In particular, the Local NID 112 which provides the subscriber drop to be monitored is configured to implement the IEEE 802.3ah Ethernet in the First Mile (EFM) Protocol and also to support the service provider MEG and MEP with continuity check. The Local NID 112 also gathers the EFM OAM Status information from the 802.3ah EFM Protocol Layer and formats the EFM OAM status information into the Status TLV. The Local NID 112 then provides the formatted Status TLV upstream in a Continuity Check Message (CCM) OAM Protocol Data Unit (PDU) to the respective Remote NID 116 via the access network 104. As used herein and shown in FIG. 1, a CCM that includes a Status TLV is referred to as a Modified CCM (MCCM) 120. A CCM is also commonly referred to as a 'heart beat' message and is typically unidirectional.

The Remote NID 116 which receives the Status TLV from the MCCM 120 is configured to create a database entry associated with the MEG End Point (MEP) ID of the Local NID 112 that is sending the MCCM 120. The database entry stores information for the Local NID 112 and information transported via the most recent Status TLV. In some embodiments, the Remote NID 116 is configured to replace previously stored Status TLV information with the most recently received Status TLV information. In other embodiments, the Remote NID 116 is configured to add the most recently received Status TLV information to the database entry with a timestamp. In such embodiments, both previous Status TLV information and the most recently received Status TLV information are stored in the database entry.

The Remote NID 116 is configured to report Status TLV information to a management device in the service provider network. The management device can be implemented as any device configured to communicate with the Remote NID 116 and perform database access. The Remote NID 116 is configured in this embodiment to support an Enable/Disable attribute (also referred to herein as a reporting attribute) to control reporting of a state change in one or more conditions, such as a critical event, a dying gasp, or a detected link fault. For example, the Remote NID 116 is configured, in some embodiments, to report the state change in one of the monitored conditions via attributes that conform to the managed elements of the IEEE 802.3ah Clause 30 Management Information Base (MIB) such that the MIB can be used to access the supported Status TLV database entry for each Local NID. The IEEE 802.3ah Clause 30 MIB provides specifications for the structure of the database entries as well as the protocol (e.g. the Simple Network Management Protocol (SNMP)) for access to the database entry in the Remote NID 116. In other embodiments, the attributes do not conform to the managed elements of the IEEE 802.3ah Clause 30 MIB specifications and other database management protocols can be implemented.

Figure 2:
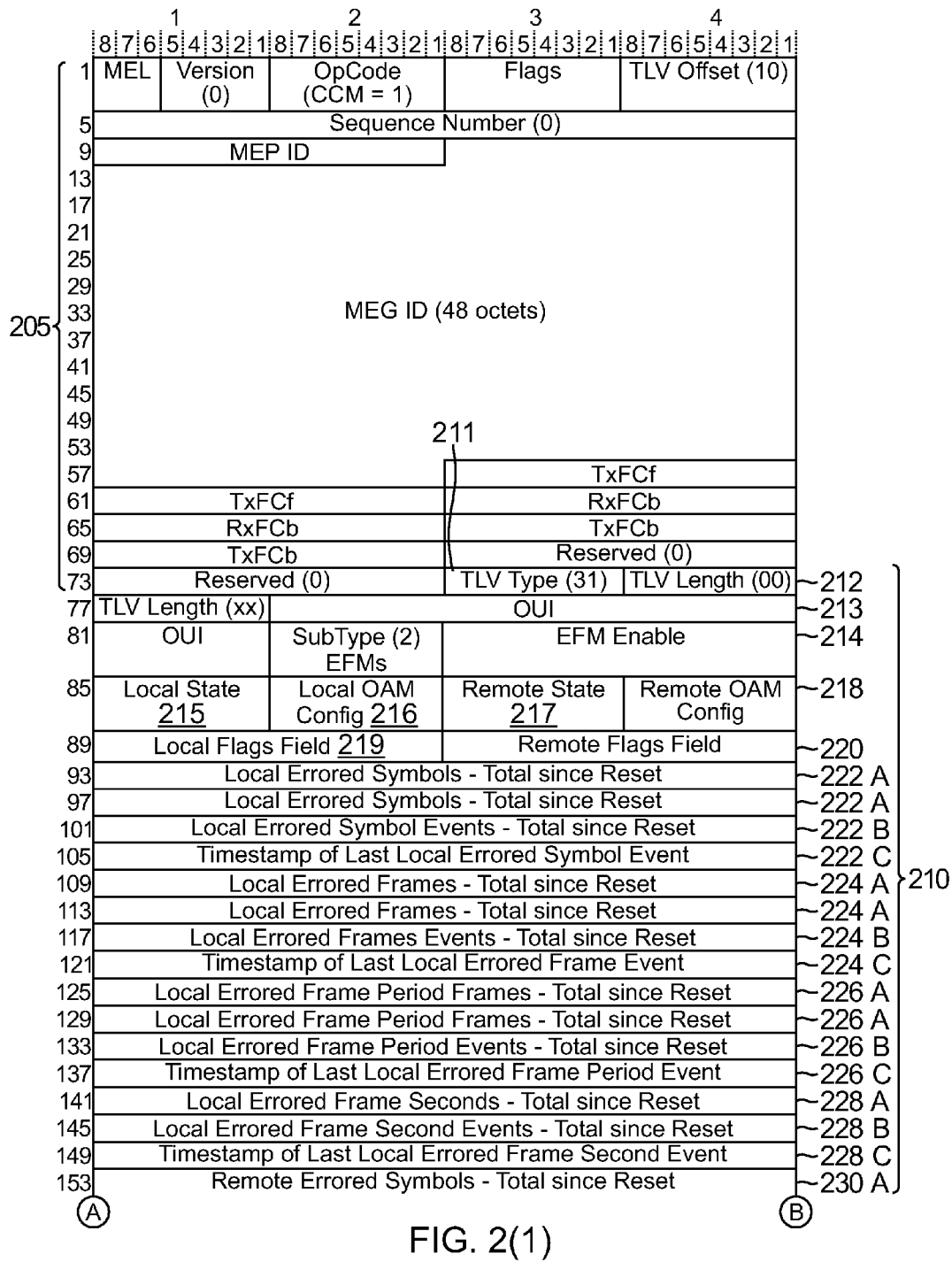
FIG. 2 depicts one embodiment of an exemplary modified continuity check message.

An exemplary MCCM 200 which has been modified to include a Status TLV is shown in FIG. 2. The MCCM 200 shown in FIG. 2 is based on the Y.1731 Standard Continuity Check Message and has been modified by adding a Status TLV element 210 to the standard CCM 205. That is, as shown in FIG. 2, the first 74 eight-bit words of MCCM 200 are the same as those defined for a Y.1731 Standard CCM. The Status TLV element 210 defines and reserves additional fields within MCCM 200 that enable the communication of status information for the subscriber drop to the service provider domain.

The fields of the exemplary Status TLV element 210 begin at field 211 with the 75$^{th}$ eight-bit word which defines the TLV type. The next field 212 is used to define the length of the remaining fields in the Status TLV. The field 213 is for an Organizationally Unique Identifier (OUI). An OUI is also commonly referred to as a company ID and is understood by one of skill in the art. Field 214 indicates that the subscriber drop interface has Link OAM enabled. Field 215 provides the Local Link OAM State and field 216 provides the Local Link OAM Configuration. Similarly, field 217 provides the Remote Link OAM State and field 218 provides the Remote Link OAM Configuration. The Local Link OAM State field 215 and the Remote Link OAM State field 217 utilize the format shown in Table 1. The Local Link OAM Configuration field 216 and the Remote Link OAM Configuration field 218 utilize the format shown in Table 2.

TABLE 1

| Bit(s) | Name | Description |
| --- | --- | --- |
| 7:3 | Reserved | In Local Information TLVs, reserved bits shall be set to zero when sending an OAMPDU, and should be ignored on reception for compatibility with future use of reserved bits. |
| 2 | Multiplexor Action | 0 = Device is forwarding non-OAMPDUs to the lower sublayer (local_mux_action = FWD). 1 = Device is discarding non-OAMPDUs (local_mux_action = DISCARD). |
| 1:0 | Parser Action | 00 = Device is forwarding non-OAMPDUs to higher sublayer (local_par_action = FWD). 01 = Device is looping back non-OAMPDUs to the lower sublayer (local_par_action = LB). 10 = Device is discarding non-OAMPDUs (local_par_action = DISCARD). 11 = Reserved. In Local Information TLVs, this value shall not be sent. If the value 11 is received, it should be ignored and not change the last received value. |

TABLE 2

| Bit(s) | Name | Description |
|---|---|---|
| 7:5 | Reserved | In Local Information TLVs, reserved bits shall be set to zero when sending an OAMPDU, and should be ignored on reception for compatibility with future use of reserved bits. |
| 4 | Variable Retrieval | 1 = DTE supports sending Variable Response OAMPDUs. 0 = DTE does not support sending Variable Response OAMPDUs. |
| 3 | Link Events | 1 = DTE supports interpreting Link Events. 0 = DTE does not support interpreting Link Events. |
| 2 | OAM Remote Loopback Support | 1 = DTE is capable of OAM remote loopback mode. 0 = DTE is not capable of OAM remote loopback mode. |
| 1 | Unidirectional Support | 1 = DTE is capable of sending OAMPDUs when the receive path is non-operational. 0 = DTE is not capable of sending OAMPDUs when the receive path is non-perational. |
| 0 | OAM Mode | 1 = DTE configured in Active mode. 0 = DTE configured in Passive mode. |

Following the Remote Link OAM Configuration field 218 are the Local Flags field 219 and the Remote Flags field 220. The Local Flags field 219 and the Remote Flags field 220 follow the format shown in Table 3.

TABLE 3

| Bit(s) | Name | Description |
|---|---|---|
| 15:7 | | Reserved bits shall be set to zero when sending an OAMPDU, and should be ignored on reception for compatibility with future use of reserved bits. |
| 6 | Remote Stable | When remote_state_valid is set to TRUE, the Remote Stable and |
| 5 | Remote Evaluating | Remote Evaluating values shall be a copy of the last received Local Stable and Local Evaluating values from the remote OAM peer. Otherwise, the Remote Stable and Remote Evaluating bits shall be set to 0. |
| 4 | Local Stable | Local Stable and Local Evaluating form a two-bit encoding shown |
| 3 | Local Evaluating | below: 4:3 0 x 0 = Local DTE Unsatisfied, Discovery can not complete 0 x 1 = Local DTE Discovery process has not completed 0 x 2 = Local DTE Discovery process has completed 0 x 3 = Reserved. This value shall not be sent. If the value 0 x 3 is received, it should be ignored and not change the last received value. |
| 2 | Critical Event | 1 = A critical event has occurred. 0 = A critical event has not occurred. |
| 1 | Dying Gasp | 1 = An unrecoverable local failure condition has occurred. 0 = An unrecoverable local failure condition has not occurred. |
| 0 | Link Fault | The PHY has detected a fault has occurred in the receive direction of the local DTE (e.g., link, Physical layer). 1 = Local device's receive path has detected a fault. 0 = Local device's receive path has not detected a fault. |

Fields 222-228 provide Local Link Monitoring events and fields 230-236 provide Remote Link Monitoring events. As shown in FIG. 2, in this example, each of fields 222-236 may store up to a thirty-two bit counter value. However, this should not be considered as limiting. In particular, in other implementations, other bit-lengths may be used. For each monitored event there is a count of total errors since last reset, the number of reported events since reset and the timestamp of the last reported event.

For example, fields 222A-222C and 230A-230C correspond to the Errored Symbol Period event which refers to when the number of symbol errors occurring during a specified period exceed a threshold. These are coding symbol errors (for example, a violation of 4B/5B coding). Fields 222A and 230A provide the count of total symbol errors since last reset for the Local Link and Remote Link, respectively. Fields 222B and 230B provide the number of reported Errored Symbol Period events since reset for the Local Link and Remote Link, respectively. Fields 222C and 230C provide the timestamp of the last reported Errored Symbol Period event for the Local Link and Remote Link, respectively.

Fields 224A-224C and 232A-232C correspond to the Errored Frame event which refers to when the number of frame errors during a specified period exceed a threshold (e.g. errored frames per second). In particular, fields 224A and 232A provide the count of total frame errors since reset for the Local Link and Remote Link, respectively. Fields 224B and 232B provide the number of reported Errored Frame events since reset for the Local Link and Remote Link, respectively. Fields 224C and 232C provide the timestamp of the last reported Errored Frame event for the Local Link and Remote Link, respectively.

Fields 226A-226C and 234A-234C correspond to the Errored Frame Period event which refers to when the number of frame errors in the last N frames exceeds a threshold, where N is a predetermined number of frames. In particular, fields 226A and 234A provide the total count of frame errors per N frames since reset for the Local Link and Remote Link, respectively. Fields 226B and 234B provide the number of reported Errored Frame Period events since reset for the Local Link and Remote Link, respectively. Fields 226C and 234C provide the timestamp of the last reported Errored Frame Period event for the Local Link and Remote Link, respectively.

Fields 228A-228C and 236A-236C correspond to the Frame Seconds Summary event which relates to when the number of errored seconds (one second intervals with at least one frame error) in the last M seconds exceeds a threshold, where M is a predetermined number of seconds. In other words, the Frame Seconds Summary event represents the number of errored seconds per M seconds. Fields 228A and 236A provide the total count of errored seconds per M seconds since reset for the Local Link and Remote Link, respectively. Fields 228B and 236B provide the number of reported Frame Seconds Summary events since reset for the Local Link and Remote Link, respectively. Fields 228C and 236C provide the timestamp of the last reported Frame Seconds Summary event for the Local Link and Remote Link, respectively. Field 238 marks the end of the Status TLV. It is to be understood that the specific Local Link events and Remote Link events discussed herein are provided by way of example and not by way of limitation. In particular, it is to be understood that other Local Link events and/or Remote Link events can be monitored in addition to or in place of those discussed herein. Furthermore, a subset of the Local Link events and/or Remote Link events discussed above can be monitored in other embodiments.

Figure 3:
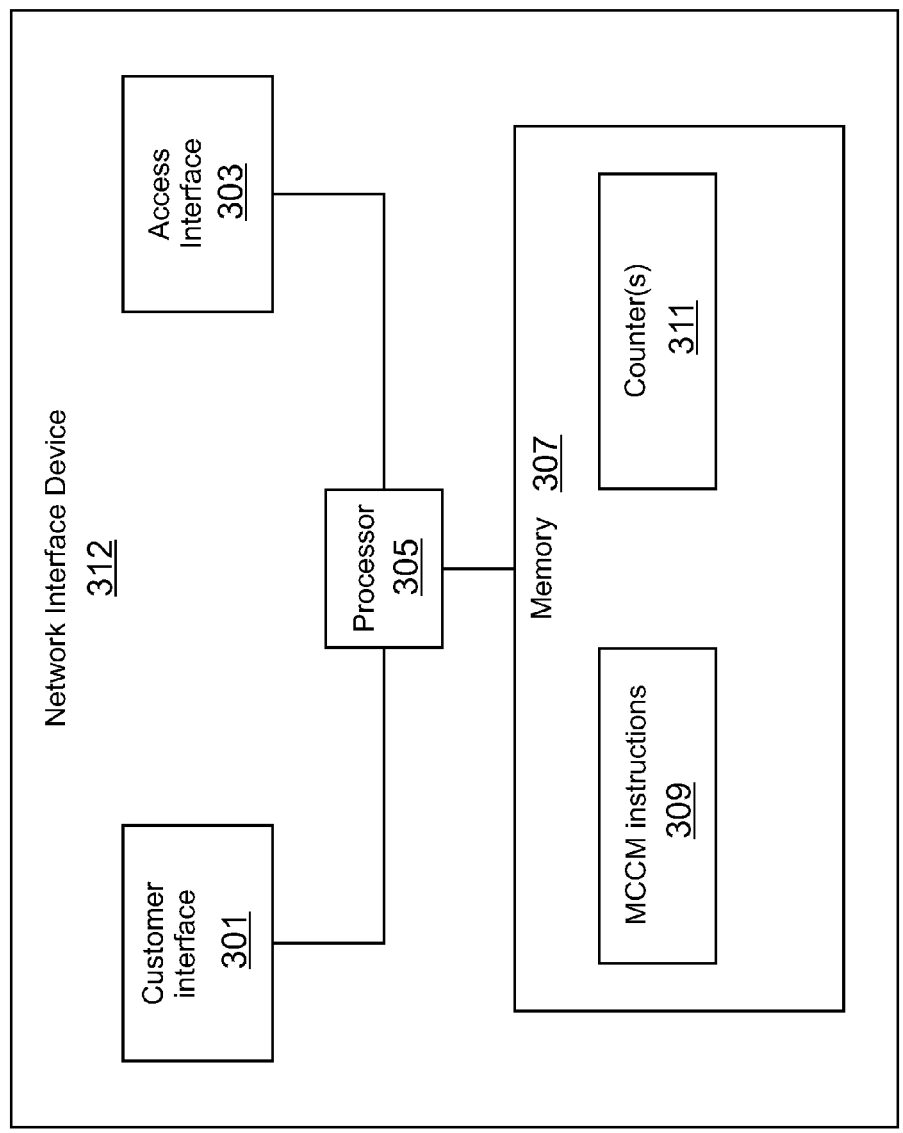
FIG. 3 is a block diagram of one embodiment of a network interface device.

FIG. 3 is a high level block diagram of one embodiment of a Local NID 312 which can be implemented in an access network such as access network 104 described above. The Local NID 312 includes a customer interface 301 and an access interface 303. The customer interface 301 receives data from and transmits data to a customer network, such as customer network 106. Similarly, the access interface 303 receives data from and transmits data to upstream device in an access network, such as access network 104.

It is to be understood that the customer interface 301 and access interface 303 include one or more components, such as, but not limited to, electro-optical converters, analog-to-digital converters, transmitters, receivers, etc. The specific components implemented in each interface depend on the network technologies used for communicating over the physical layer implemented in the access network and the subscriber drop to the customer network, as understood by one of skill in the art.

The Local NID 312 also includes a processor 305. The processor 305 is coupled to customer interface 301 and access interface 303. The processor 305 is configured to direct the operation of customer interface 301 and access interface 303. In addition, the processor 305 is configured to process data received over customer interface 301 to detect errors. For example, the processor 305 is configured to update one or more counters 311 stored on memory 307 to maintain a record of detected errors. In addition, the processor 305 executes MCCM instructions 309 stored on memory 307. The MCCM instructions 309 cause the processor 305 to insert a Status TLV into a continuity check message to form an MCCM as discussed above. The MCCM is then transmitted via the access interface 303 to a remote NID in the access network as discussed above.

Figure 4:
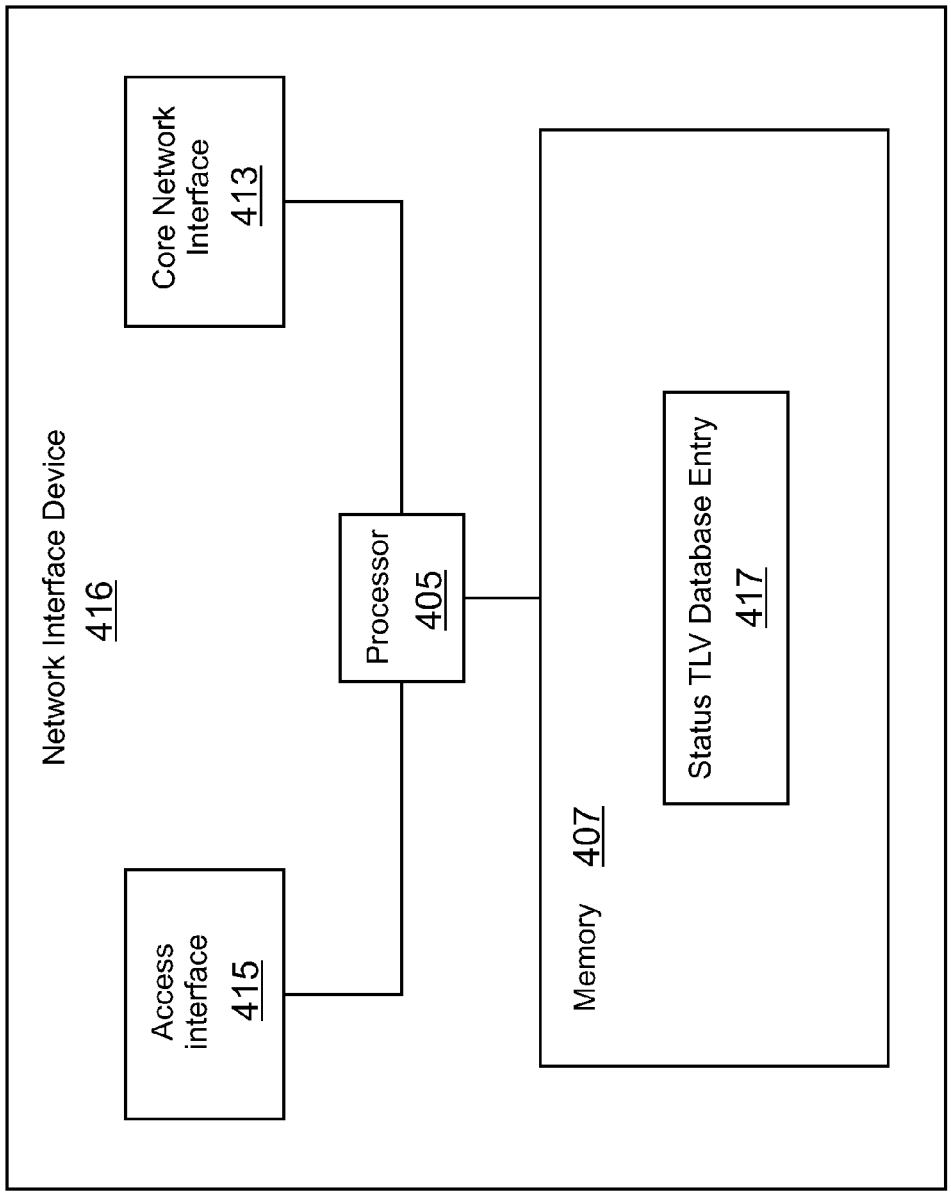
FIG. 4 is a block diagram of one embodiment of another network interface device.

The MCCM instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link FIG. 4 is a high level block diagram of one embodiment of a Remote NID 416 which can be implemented in an access network such as access network 104 described above. The Remote NID 416 includes an access interface 415 and a core network interface 413. The access interface 415 receives data from and transmits data to an access network, such as access network 104. Similarly, the core network interface 413 receives data from and transmits data to a core network of a service provider network, such as core network 108.

It is to be understood that the access interface 415 and core network interface 413 include one or more components, such as, but not limited to, electro-optical converters, analog-to-digital converters, transmitters, receivers, etc. The specific components implemented in each interface depend on the network technologies used for communicating over the physical layer implemented in the access network and the subscriber drop to the customer network, as understood by one of skill in the art.

The Remote NID 416 also includes a processor 405. The processor 405 is coupled to access interface 415 and core network interface 413. The processor 405 is configured to direct the operation of access interface 415 and core network interface 413. In addition, the processor 405 is configured to process data received over access interface 415. In particular, the processor 405 is configured to extract data from a Status TLV element in a modified CCM received from a downstream device in the access network, such as the Local NID 312 described above.

The processor 405 stores the extracted data in memory 407 in a database entry 417 associated with an identification number of the downstream device which sent the modified CCM. For example, the identification number can be a Media Access Control (MAC) address of the downstream device in some embodiments. In some embodiments, when the Remote NID 416 receives subsequent Status TLV element from the same downstream device, the processor 405 replaces the stored data with the subsequently received data. In other embodiments, when the Remote NID 416 receives a subsequent Status TLV element from the same downstream device, the processor 405 adds the subsequently received (e.g. most recently received) data to the previously stored data. In addition, in some embodiments, the processor 405 includes a timestamp with the data from each respective Status TLV element as it is stored in the database entry.

In some embodiments, the processor 405 is further configured to control reporting a state change to an operator through an enable/disable attribute. For example, table 4 includes three exemplary link fault conditions that are reported through an enable/disable attribute. Table 4 also includes what each attribute value indicates to an operator. Thus, when a state change is detected based on the data in the received Status TLV, the processor 405 sets the enable/disable attribute corresponding to the respective link fault condition to report the state change in the respective link fault condition to the operator.

TABLE 4

| | |
|---|---|
| Critical Event | 1 = A critical event has occurred. |
| | 0 = A critical event has not occurred. |
| Dying Gasp | 1 = An unrecoverable local failure condition has occurred. |
| | 0 = An unrecoverable local failure condition has not occurred. |
| Link Fault | The PHY has detected a fault has occurred in the receive direction of the local DTE (e.g., link, Physical layer). |
| | 1 = Local device's receive path has detected a fault. |
| | 0 = Local device's receive path has not detected a fault. |

Figure 5:
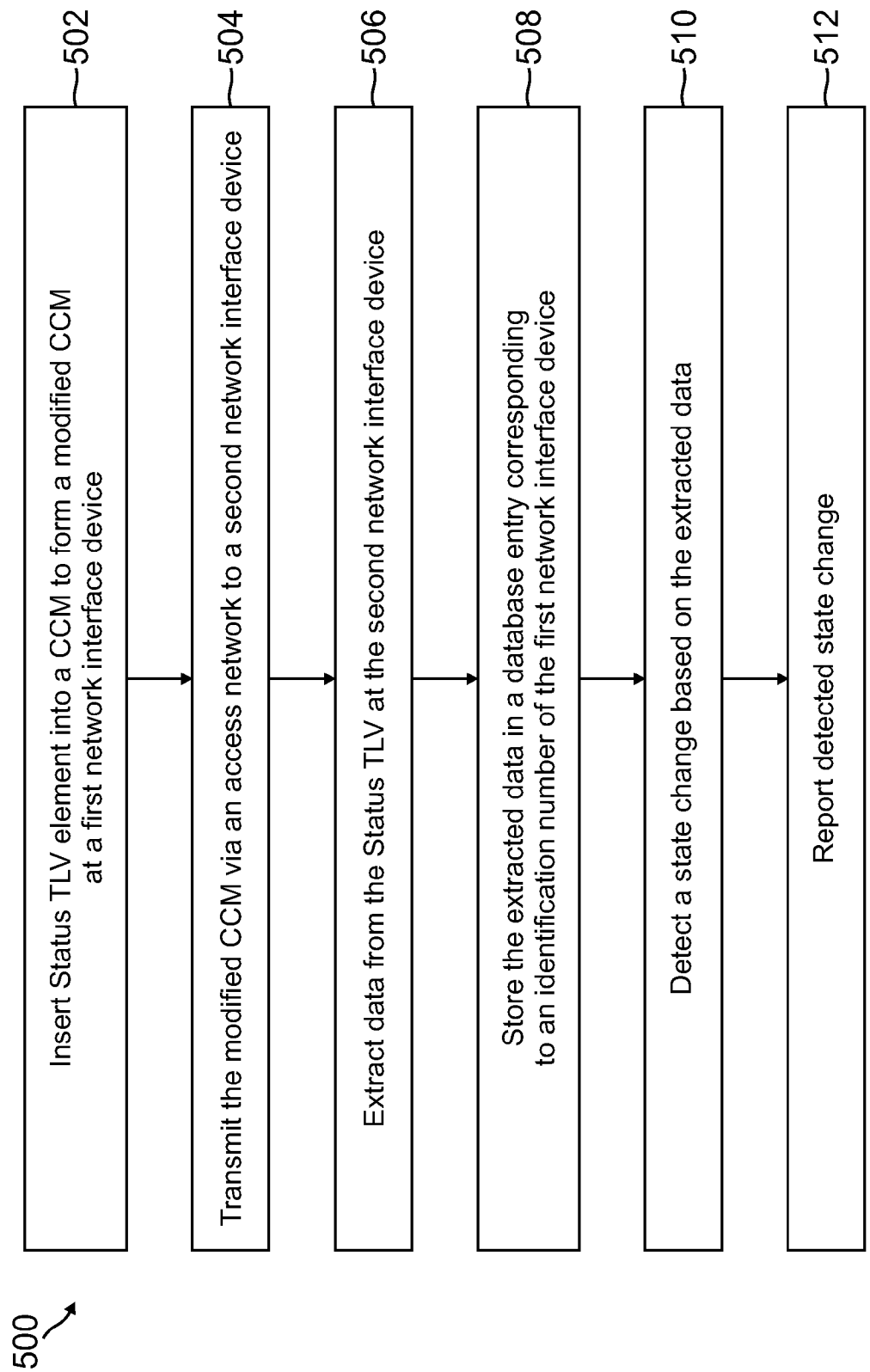
FIG. 5 is a flow chart depicting one embodiment of a method of propagating link status across a network.

FIG. 5 is a flow chart depicting an exemplary method 500 of propagating link status across a network. Method 500 can be implemented in a network such as access network 104 described above. At block 502, a Status TLV element is inserted into a CCM to form a modified CCM at a first network interface device as discussed above. The first network interface device is configured to provide an interface between a customer network and an access network. The Status TLV element comprises fields for a dying gasp indication from a customer premise equipment in the customer network and/or performance monitoring data for the link coupling the customer network to the first network interface device. The fields for performance monitoring data in the Status TLV, in some embodiments, include fields for one or more monitored link events, such as, errored symbol period event, errored frame event, errored frame period event, and/or errored frame seconds summary event.

At block 504, the modified CCM is transmitted via an access network to a second network interface device. The second network interface device is configured to provide an interface between the access network and a core network of a service provider network. At block 506, the second network interface device extracts the data from the Status TLV. At block 508, the second network interface device stores the extracted data in a database entry corresponding to an identification number of the first network interface device. In some embodiments, the stored data is replaced when a subsequent Status TLV associated with the first network interface device is received, as described above. In other embodiments, the data from a subsequent Status TLV is added to the previously stored data and a timestamp is included when the entry is updated with the subsequent data.

At block 510, a state change in one or more link fault conditions is detected based on the data extracted from the Status TLV. The link fault conditions can include critical events, dying gasp, and/or a link fault in the receive path as discussed above. At block 512, a detected state change is reported to an operator via a reporting attribute (also referred to herein as an Enable/Disable attribute) as discussed above.

Hence, the embodiments described above enable the transport of link status data across a network, such as an Ethernet network, to where a service provider may monitor the local link performance monitoring or remote link events like a 'Dying Gasp'. In conventional systems, the local link performance monitoring and remote link events like a 'Dying Gasp' are not available in the domain of the service provider. However, the embodiments described herein place such information into the management domain of the service provider via the modified CCM described above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An access network comprising:
a first network interface device coupled to a customer network and configured to provide an interface between the access network and the customer network;
a second network interface device coupled to a core network and configured to provide an interface between the access network and the core network;
wherein the first network interface device is configured to insert a Status Type Length Value (TLV) element into a Continuity Check Message (CCM) to form a modified CCM, the first network interface device configured to transmit the modified CCM to the second network interface device;
wherein the Status TLV element includes fields for at least one of a dying gasp indication from a customer premise equipment in the customer network or performance monitoring data for the link coupling the customer network to the first network interface device;
wherein the second network interface device is configured to store data from the Status TLV in a database entry associated with an identification number of the first network interface device; and
wherein the second network interface device is configured to support an enable/disable attribute to control reporting of a state change to an operator; the state change determined based on the data in the Status TLV from the first network interface device.

2. The access network of claim 1, wherein the performance monitoring data in the Status TLV includes one or more monitored link events, the one or more monitored link events comprising at least one of errored symbol period event, errored frame event, errored frame period event, and errored frame seconds summary event.

3. The access network of claim 1, wherein the modified CCM is a Y.1731 standard compliant Continuity Check Message modified to include the Status TLV element.

4. The access network of claim 1, wherein the first network interface device is coupled to the customer network via an optical fiber.

5. The access network of claim 1, wherein the access network implements optical fiber over which the modified CCM is communicated from the first network interface device to the second network device.

6. The access network of claim 1, wherein the second network interface device is configured to modify the database entry by replacing data from a previously received Status TLV element corresponding to the first network interface device with data from a most recently received Status TLV element corresponding to the first network interface device.

7. The access network of claim 1, wherein the second network interface device is configured to add data from a most recently received Status TLV element corresponding to the first network interface device to the database entry in which data from a previously received Status TLV element corresponding to the first network interface device is stored.

8. A network interface device comprising:
a first interface configured to receive data from and transmit data to a customer network;
a second interface configured to receive data from and transmit data to an upstream device in an access network;
a processor coupled to the first interface and the second interface, the processor configured to direct operation of the first interface and the second interface; and
a memory configured to store one or more counters, each counter associated with a respective monitored link event;
wherein the processor is configured to update the one or more counters when a respective monitored link event is detected; and
wherein the processor is configured to insert a Status Type Length Value (TLV) element into a Continuity Check Message (CCM) to form a modified CCM, the processor further configured to cause the modified CCM to be transmitted to the upstream device in the access network via the second interface;
wherein the Status TLV element includes fields for at least one of a dying gasp indication from a customer premise equipment in the customer network and counter data for one or more monitored link events stored in the memory, the one or more monitored link events corresponding to a link coupling the customer network to the first interface; and
wherein the second network interface device is configured to support an enable/disable attribute to control reporting of a state change to an operator; the state change determined based on the data in the Status TLV.

9. The network interface device of claim 8, wherein the one or more monitored link events comprise at least one of errored symbol period event, errored frame event, errored frame period event, and errored frame seconds summary event.

10. The network interface device of claim 8, wherein the modified CCM is a Y.1731 standard compliant Continuity Check Message modified to include the Status TLV element.

11. The network interface device of claim 8, wherein the first interface is an optical interface configured to be coupled to the customer network via an optical fiber.

12. A network interface device comprising:
a first interface configured to transmit data to and receive data from a downstream device that provides an interface to a customer network;
a second interface configured to transmit data to and receive data from a core network of a service provider network;
a processor coupled to the first interface and the second interface, the processor configured to direct operation of the first interface and the second interface; and
a memory coupled to the processor;
wherein the processor is configured to extract data from a Status Type Length Value (TLV) element inserted into a modified Continuity Check Message (CCM) received over the first interface from the downstream device, the Status TLV including fields for at least one of a dying gasp indication from a customer premise equipment in the customer network or performance monitoring data for the link coupling the customer network to the downstream device;
wherein the processor is configured to store the extracted data in a database entry in the memory, the database entry associated with an identification number of the downstream device; and
wherein the processor is configured to report a state change via a reporting attribute, the state change determined by the processor based on the data in the Status TLV received from the downstream device.

13. The network interface device of claim 12, wherein the processor is configured to modify the database entry by replacing data from a previously received Status TLV element corresponding to downstream device with data from a newly received Status TLV element corresponding to the downstream device.

14. The network interface device of claim 12, wherein the processor is configured to add data from a newly received Status TLV element corresponding to the downstream device to the database entry in which data from a previously received Status TLV element corresponding to the downstream device is stored.

15. A method of propagating link status across a network, the method comprising:
inserting a Status Type Length Value (TLV) element into a Continuity Check Message (CCM) to form a modified CCM at a first network interface device configured to provide an interface between a customer network and an access network, the Status TLV element including fields for at least one of a dying gasp indication from a customer premise equipment in the customer network or performance monitoring data for the link coupling the customer network to the first network interface device;
transmitting the modified CCM via the access network to a second network interface device configured to provide an interface between the access network and a core network of a service provider network;
extracting data from the Status TLV at the second network interface device; and
storing the extracted data at the second network interface device in a database entry corresponding to an identification number of the first network interface device
determining a state change based on the data extracted from the Status TLV; and
reporting a state change to an operator via an associated reporting attribute.

16. The method of claim 15, wherein the fields for performance monitoring data in the Status TLV includes fields for one or more monitored link events, the one or more monitored link events comprising at least one of errored symbol period event, errored frame event, errored frame period event, and errored frame seconds summary event.

17. The method of claim 15, wherein the modified CCM is a Y.1731 standard compliant Continuity Check Message modified to include the Status TLV element.

* * * * *